United States Patent
Tsirkin

(10) Patent No.: US 9,094,351 B2
(45) Date of Patent: Jul. 28, 2015

(54) IMPLICIT AND DYNAMIC RECEIVE QUEUE ASSIGNMENT IN VIRTUALIZED SYSTEMS

(71) Applicant: Michael Tsirkin, Yokneam Yillit (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 140 days.

(21) Appl. No.: 13/830,966

(22) Filed: Mar. 14, 2013

(65) Prior Publication Data

US 2014/0269750 A1    Sep. 18, 2014

(51) Int. Cl.
*G06F 9/455*    (2006.01)
*H04L 12/861*   (2013.01)
*H04L 12/931*   (2013.01)

(52) U.S. Cl.
CPC ............ *H04L 49/90* (2013.01); *G06F 9/45558* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 8,018,961 B2 | 9/2011 | Gopinath et al. | |
| 8,155,135 B2 | 4/2012 | Aloni et al. | |
| 2009/0213732 A1* | 8/2009 | Veal et al. | 370/230 |
| 2010/0100890 A1* | 4/2010 | Dar et al. | 719/314 |
| 2010/0169501 A1* | 7/2010 | King et al. | 709/230 |
| 2010/0232443 A1* | 9/2010 | Pandey | 370/401 |
| 2010/0272111 A1* | 10/2010 | Kini et al. | 370/395.53 |
| 2011/0087774 A1* | 4/2011 | Pope et al. | 709/224 |
| 2011/0179416 A1* | 7/2011 | Patale et al. | 718/1 |
| 2011/0252419 A1* | 10/2011 | Cardona et al. | 718/1 |
| 2011/0274110 A1* | 11/2011 | Mmmadi et al. | 370/392 |
| 2012/0331250 A1* | 12/2012 | Nelson | 711/162 |
| 2013/0104124 A1* | 4/2013 | Tsirkin et al. | 718/1 |

* cited by examiner

*Primary Examiner* — Christopher Crutchfield
(74) *Attorney, Agent, or Firm* — Lowenstein Sandler LLP

(57) ABSTRACT

A system and method are disclosed for assigning incoming packets to receive queues of a virtual machine. In accordance with one embodiment, a hypervisor that is executed by a computer system receives a request from a virtual machine to transmit an outgoing packet to a destination, and an identification of a receive queue of a plurality of receive queues of the virtual machine, where the identification of the receive queue is provided to the hypervisor by the virtual machine along with the request. The hypervisor obtains a flow identifier from a header of the outgoing packet that identifies a flow associated with the outgoing packet, and the outgoing packet is transmitted to the destination. The computer system then receives an incoming packet whose header specifies the flow identifier, and the hypervisor inserts the incoming packet into the receive queue using the identification of the receive queue.

19 Claims, 8 Drawing Sheets

IMPLICIT AND DYNAMIC RECEIVE QUEUE ASSIGNMENT IN VIRTUALIZED SYSTEMS

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
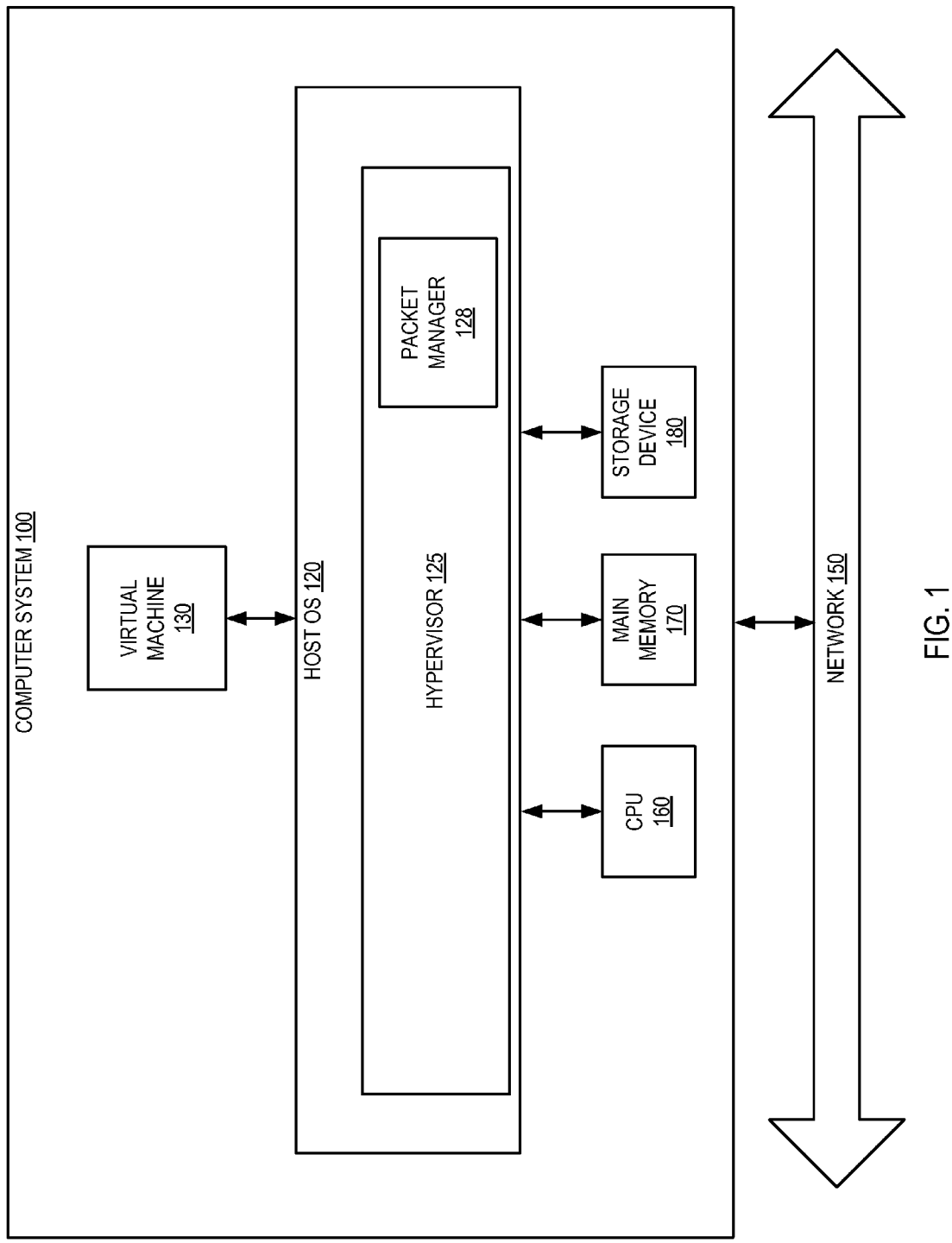
FIG. 1 depicts an illustrative computer system architecture, in accordance with an embodiment of the present disclosure.

Described herein is a system and methods by which incoming packets may be assigned dynamically and implicitly to receive queues of a virtual machine. In one embodiment, a guest operating system of a virtual machine transmits to a hypervisor a request to transmit an outgoing packet to a destination. The guest operating system also provides to the hypervisor an identification of one of the receive queues of the virtual machine. The hypervisor obtains a flow identifier from the header of the outgoing packet that identifies a flow associated with the outgoing packet, and stores an association between the flow identifier and the identified receive queue in a table. The outgoing packet is then transmitted to the destination. When the computer system subsequently receives an incoming packet, the hypervisor obtains a flow identifier from the header of the incoming packet, and performs a table lookup to determine which receive queue of the virtual machine should receive the incoming packet. The incoming packet is then placed in the receive queue determined by the table lookup.

In one embodiment, the guest operating system is paravirtualized in order to provide the identification of the receive queue to the hypervisor. Paravirtualization is a technique by which a guest operating system is modified and recompiled to execute on top of a hypervisor. More particularly, in accordance with some embodiments of the present disclosure, one or more commands may be added to the guest operating system so that when the guest OS provides an outgoing packet to the hypervisor for transmission to a destination (e.g., another machine accessible via a network, etc.), the guest OS also provides the hypervisor with an identification of one of the receive queues of the virtual machine.

In some examples, the virtual machine may have a single transmit queue, while in some other examples, the virtual machine may have a plurality of transmit queues in addition to a plurality of receive queues. When the virtual machine has a plurality of transmit queues, each of the transmit queues is mapped to a respective receive queue of the virtual machine (not necessarily in a one-to-one fashion), and the appropriate receive queue may be identified indirectly by identifying the transmit queue that is mapped to the receive queue.

Embodiments of the present disclosure thus provide a mechanism by which incoming packets can be "steered" dynamically to the appropriate receive queue of a virtual machine. Moreover, the steering is performed implicitly by the guest operating system and the hypervisor, so that the steering is transparent to a program in the virtual machine that is transmitting and receiving packets. In contrast, in approaches of the prior art, such steering is typically done either in a static and inflexible fashion, or is done dynamically via a device driver that executes additional commands and adds overhead. Embodiments of the present disclosure thus enable incoming packets to be steered dynamically to the receive queues of a virtual machine, without the performance penalty associated with prior approaches.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing units (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.) that serves as a secondary memory, connected by a bus 190 (e.g., a Peripheral Component Interconnect [PCI] bus, a Universal Serial Bus [USB}, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120, which comprises software, hardware, or both, that manages the hardware resources of the computer system and that provides functions such as interprocess communication, scheduling, virtual memory management, and so forth. In some examples, host operating system 120 also comprises a hypervisor 125, which provides a virtual operating platform for virtual machine 130 and that manages its execution. In accordance with one such example, hypervisor 125 includes a packet manager 128 that is capable of receiving requests from virtual machines to transmit outgoing packets, obtaining a flow identifier for each outgoing packet, maintaining a table that associates flow identifiers with receive queues of a virtual machine, transmitting outgoing packets to their destinations, receiving incoming packets, performing table lookups to determine which receive queues should receive incoming packets, and inserting incoming packets into the appropriate receive queues, as described below with respect to FIGS. 6 and 7. It should be noted that in some other examples, hypervisor 125 may be external to host OS 120, rather than embedded within host OS 120.

Virtual machine 130 is a software implementation of a machine that executes programs as though it were an actual physical machine. It should be noted that although, for simplicity, a single virtual machine is depicted in FIG. 1, in some other embodiments computer system 100 may host a plurality of virtual machines. Virtual machine 130 is described in more detail below with respect to FIG. 2.

Figure 2:
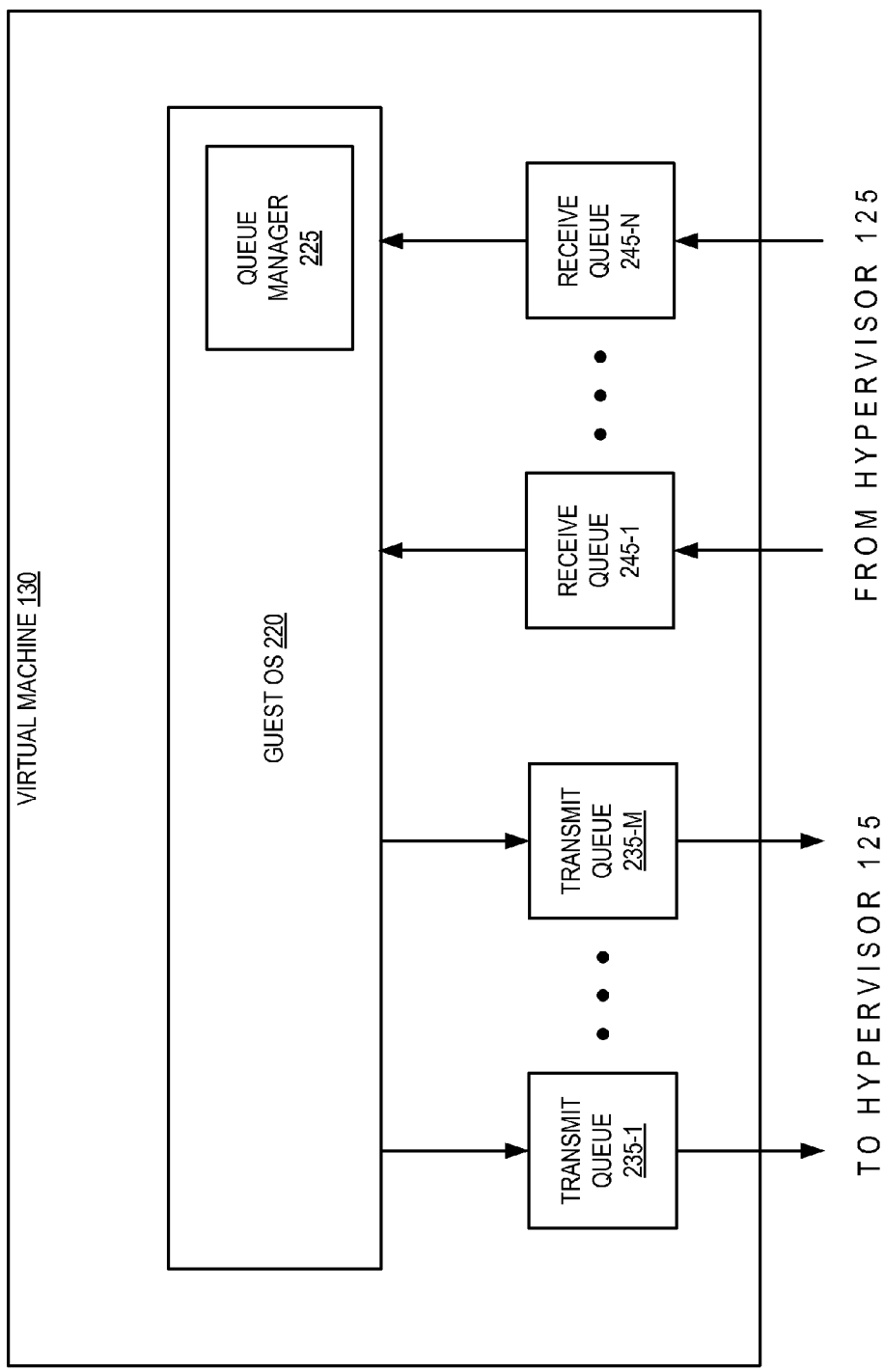
FIG. 2 depicts a block diagram of elements of a virtual machine, in accordance with an embodiment of the present disclosure.

FIG. 2 depicts a block diagram of elements of virtual machine 130, in accordance with an embodiment of the present disclosure. As shown in FIG. 2, virtual machine 130 comprises a guest operating system 220, one or more transmit queues 235-1 through 235-M, where M is a positive integer, and a plurality of receive queues 245-1 through 245-N, where N is an integer greater than one that may or may not equal M.

Guest operating system (OS) 220 comprises software, hardware, or both, that manages the execution of programs within virtual machine 130. In accordance with one embodiment, guest OS 220 is modified via paravirtualization to include a queue manager 225 that associates an outgoing packet with one of the receive queues 245, inserts requests to transmit outgoing packets into transmit queues 235, and provides to hypervisor 125 an identification of the receive queue associated with an outgoing packet, as described below with respect to FIGS. 3 through 5.

Figure 3:
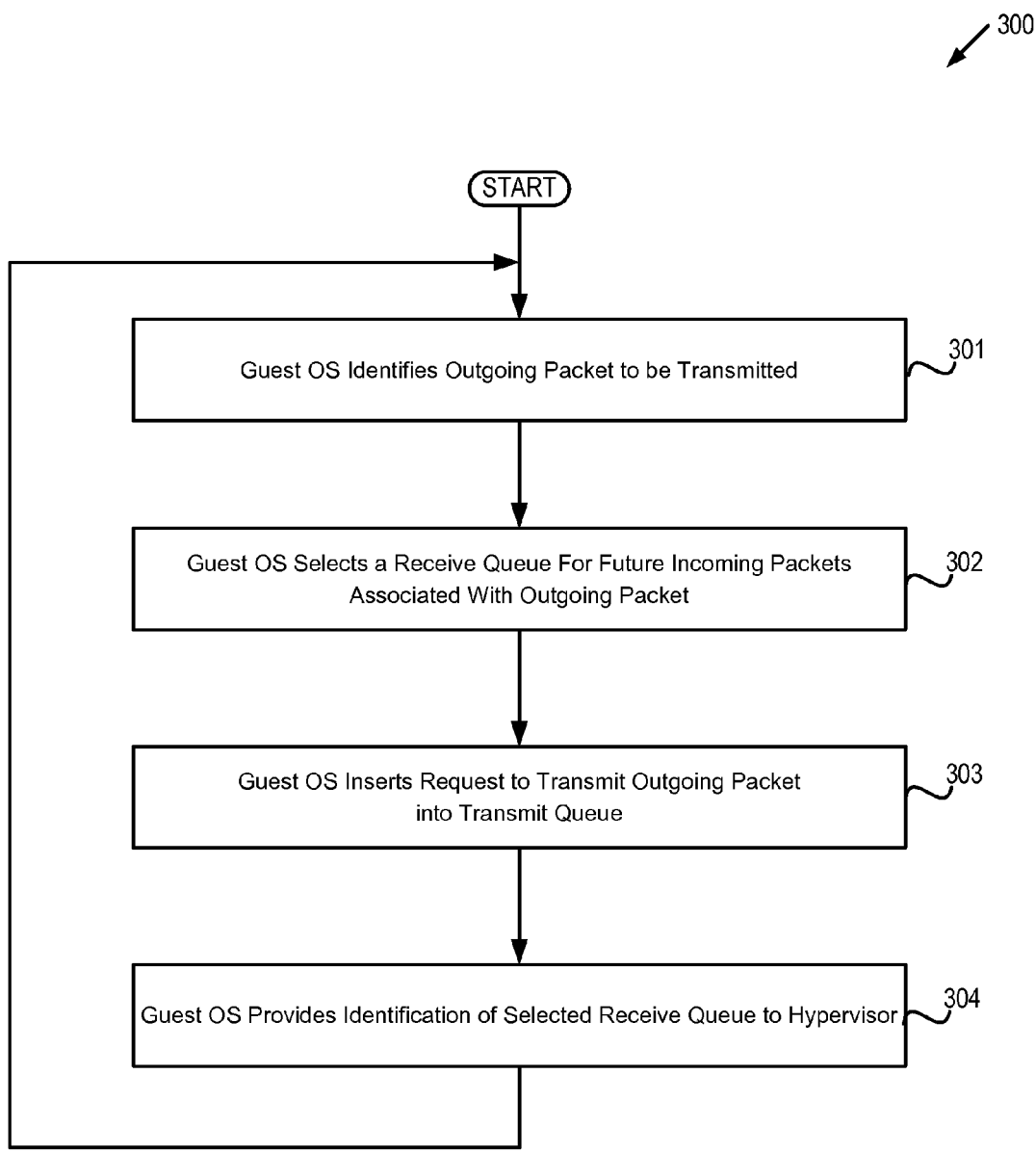
FIG. 3 depicts a flow diagram of one example of a first method by which a guest operating system processes outgoing packets.

FIG. 3 depicts a flow diagram of one example of a first method 300 by which a guest operating system processes outgoing packets. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, and more particularly, by a paravirtualized guest OS that is hosted by a virtual machine with a single transmit queue. It should be noted that in some embodiments blocks depicted in FIG. 3 may be performed simultaneously or in a different order than that depicted.

At block 301, guest OS 220 of virtual machine 130 identifies an outgoing packet to be transmitted to a destination (e.g., via network 150 to another machine, etc.). The outgoing packet may be transmitted by a program hosted by virtual machine 130 (e.g., an application, a shell script, etc.). In one embodiment, block 301 is performed by queue manager 225.

At block 302, guest OS 220 selects a receive queue 245-$i$, where i is an integer between 1 and N inclusive, for future incoming packets associated with the outgoing packet. At block 303, guest OS 220 inserts a request to transmit the outgoing packet into the sole transmit queue 235. In one embodiment, blocks 302 and 303 are performed by queue manager 225.

At block 304, guest OS 220 provides an identification of the selected receive queue 245-$i$ to hypervisor 125. In some examples the identification may be a queue number (e.g., index i, etc.), while in some other examples the identification may be an address of the receive queue 245-$i$, while in still other examples the selected receive queue 245-$i$ may be identified in some other fashion. It should be noted that the identification may be provided in a variety of ways, such as via a message from guest OS 220 to hypervisor 125, or by storing the identification in a predefined location of memory 170 that is read by hypervisor 125, etc. After block 304, execution continues back at block 301. In one embodiment, block 304 is performed by queue manager 225.

Figure 4:
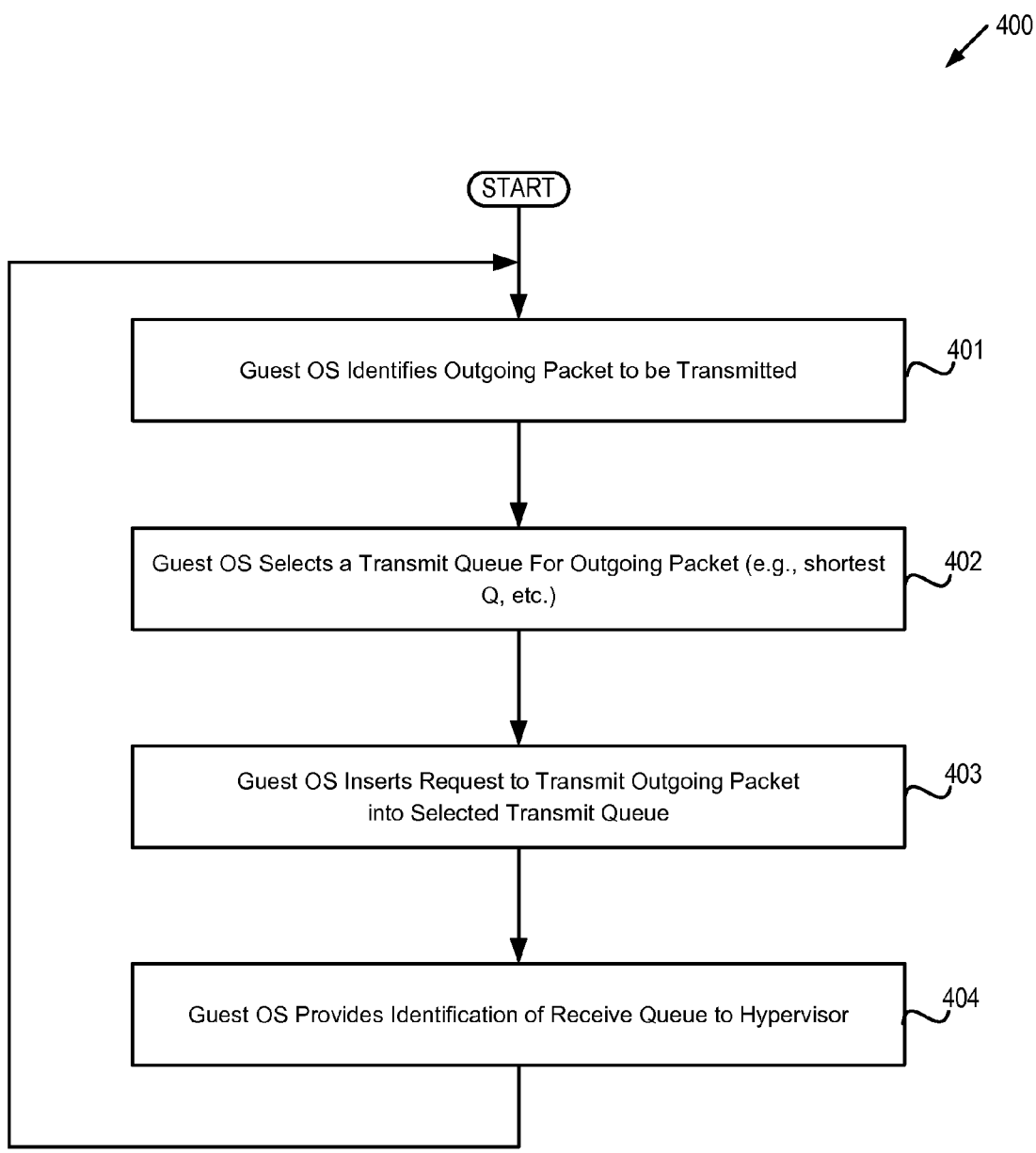
FIG. 4 depicts a flow diagram of one example of a second method by which a guest operating system processes outgoing packets.

FIG. 4 depicts a flow diagram of one example of a second method 400 by which a guest operating system processes outgoing packets. In one embodiment, the method is performed by a paravirtualized guest OS that is hosted by a virtual machine with multiple transmit queues. It should be noted that in some embodiments blocks depicted in FIG. 4 may be performed simultaneously or in a different order than that depicted.

At block 401, guest OS 220 of virtual machine 130 identifies an outgoing packet to be transmitted to a destination (e.g., via network 150 to another machine, etc.). The outgoing packet may be transmitted by a program hosted by virtual machine 130 (e.g., an application, a shell script, etc.). In one embodiment, block 401 is performed by queue manager 225.

At block 402, guest OS 220 selects a transmit queue 235-$j$, where j is an integer between 1 and M inclusive, for transmitting the outgoing packet. At block 403, guest OS 220 inserts a request to transmit the outgoing packet into the selected transmit queue 235-$j$. In one embodiment, blocks 402 and 403 are performed by queue manager 225.

At block 404, guest OS 220 provides to hypervisor 125 an identification of the particular receive queue to which transmit queue 235-$j$ is mapped. In some examples, M equals N and each transmit queue is mapped to a receive queue in a one-to-one fashion (e.g., transmit queue 235-1 mapped to receive queue 245-1, transmit queue 235-2 mapped to receive queue 245-2, etc.), while in some other examples, M and N may be different and the mapping may not be one-to-one. In one example, the identification may be a queue number (e.g., index j of the transmit queue, the index of the receive queue to which transmit queue 235-j is mapped, etc.), while in some other examples the identification may be an address of the receive queue to which transmit queue 235-j is mapped, while in still other examples the receive queue may be identified in some other fashion. It should be noted that the identification may be provided in a variety of ways, such as via a message from guest OS 220 to hypervisor 125, or by storing the identification in a predefined location of memory 170 that is read by hypervisor 125, etc. After block 404, execution continues back at block 401. In one embodiment, block 404 is performed by queue manager 225.

Figure 5:
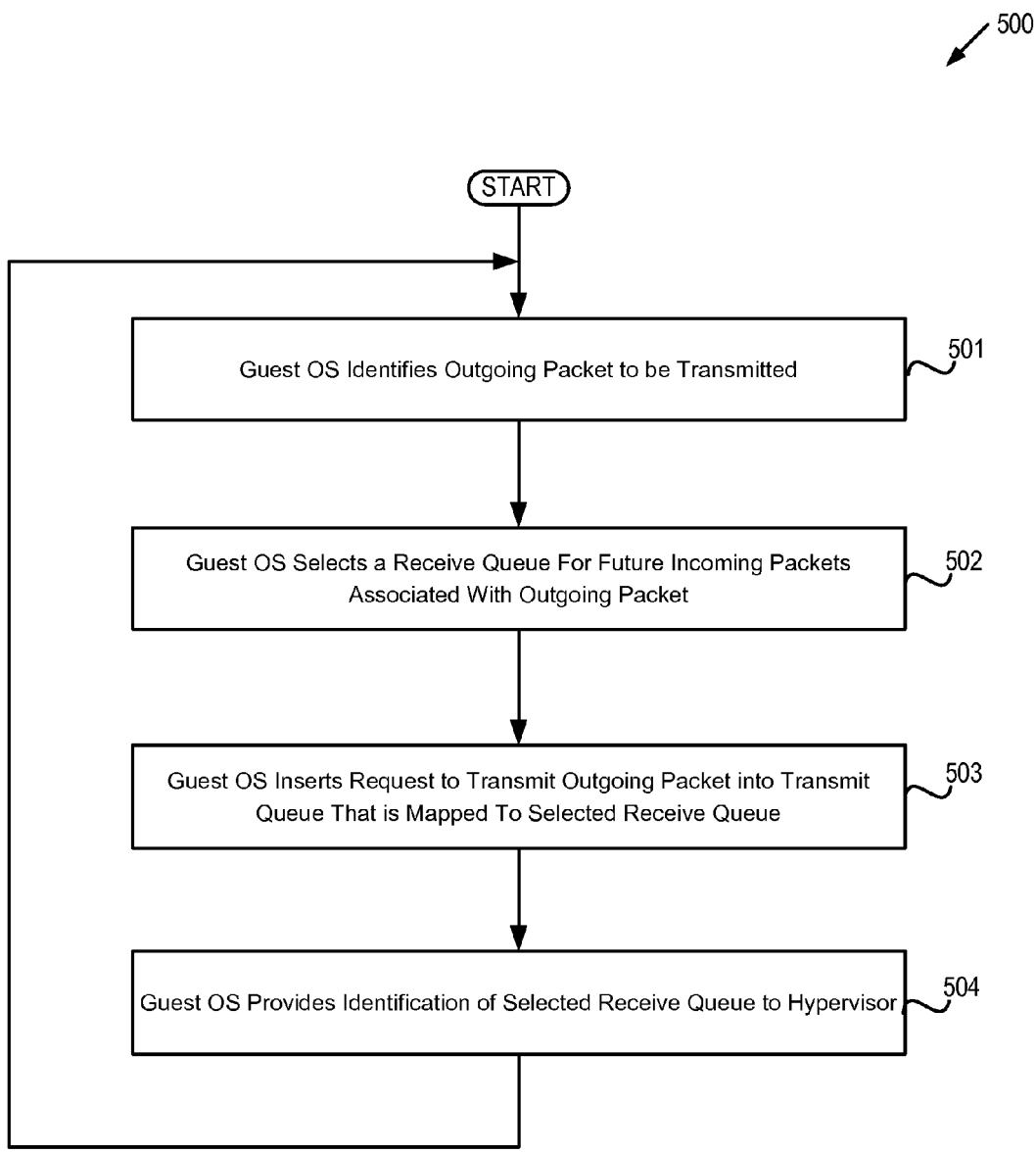
FIG. 5 depicts a flow diagram of one example of a third method by which a guest operating system processes outgoing packets.

FIG. 5 depicts a flow diagram of one example of a third method 500 by which a guest operating system processes outgoing packets. In one embodiment, the method is performed by a paravirtualized guest OS that is hosted by a virtual machine with multiple transmit queues. It should be noted that in some embodiments blocks depicted in FIG. 5 may be performed simultaneously or in a different order than that depicted.

At block 501, guest OS 220 of virtual machine 130 identifies an outgoing packet to be transmitted to a destination (e.g., via network 150 to another machine, etc.). The outgoing packet may be transmitted by a program hosted by virtual machine 130 (e.g., an application, a shell script, etc.). In one embodiment, block 501 is performed by queue manager 225.

At block 502, guest OS 220 selects a receive queue 245-k, where k is an integer between 1 and N inclusive, for future incoming packets associated with the outgoing packet. At block 503, guest OS 220 inserts a request to transmit the outgoing packet into a transmit queue that is mapped to the selected receive queue 245-k. It should be noted that when there are multiple transmit queues mapped to the selected receive queue 245-k, one of the multiple transmit queues may be selected in accordance with a predefined queuing strategy (e.g., round robin, insert into the shortest queue, etc.). In one embodiment, blocks 502 and 503 are performed by queue manager 225.

At block 504, guest OS 220 provides to hypervisor 125 an identification of the selected receive queue 245-k. In some examples the identification may be a queue number (e.g., index k of the receive queue, the index of the transmit queue that is mapped to receive queue 245-k, etc.), while in some other examples the identification may be an address of the receive queue 245-k, while in still other examples the selected receive queue 245-k may be identified in some other fashion. It should be noted that the identification may be provided in a variety of ways, such as via a message from guest OS 220 to hypervisor 125, or by storing the identification in a predefined location of memory 170 that is read by hypervisor 125, etc. After block 504, execution continues back at block 501. In one embodiment, block 504 is performed by queue manager 225.

Figure 6:
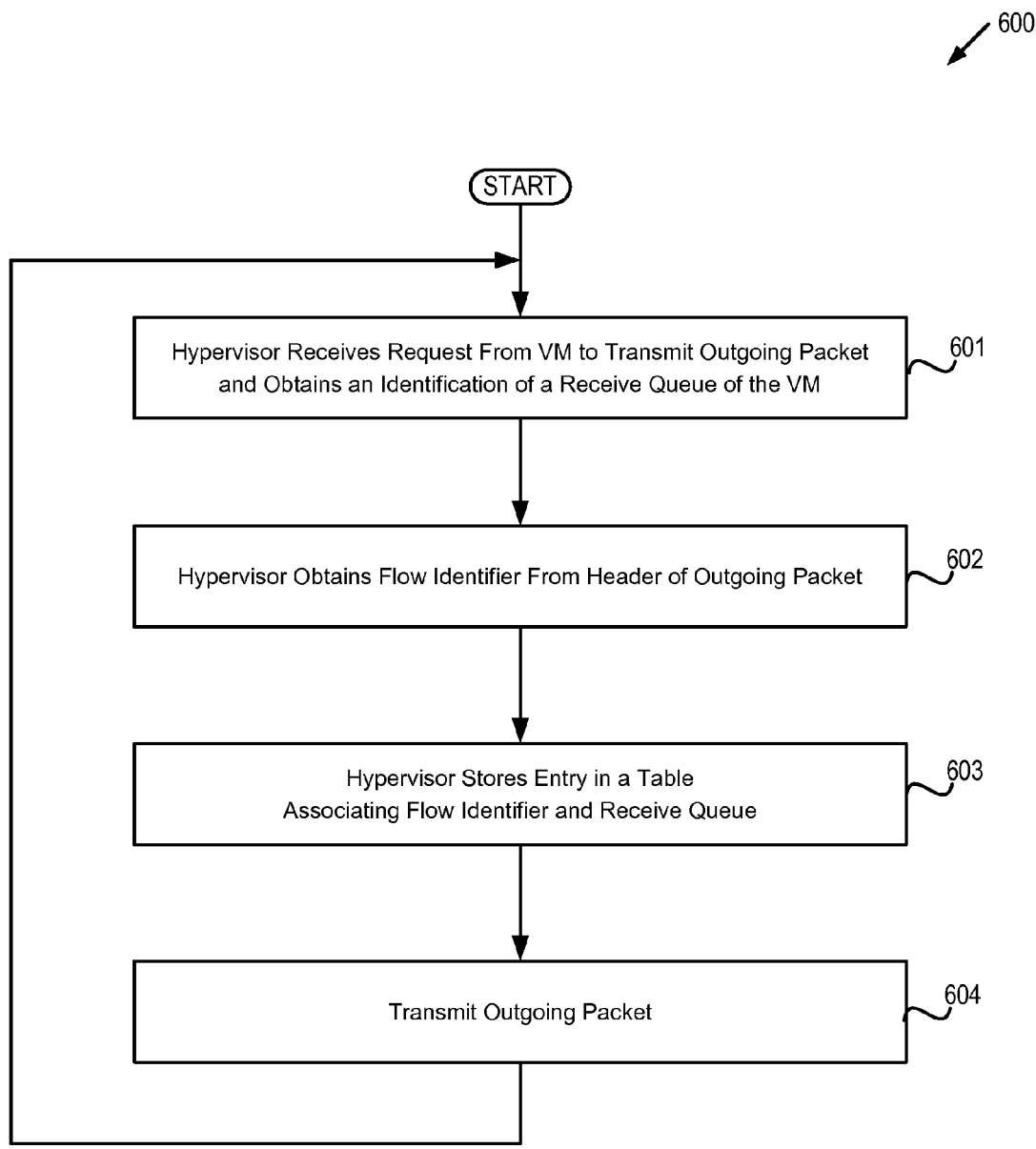
FIG. 6 depicts a flow diagram of one example of a method by which a hypervisor handles outgoing packets from a virtual machine.

FIG. 6 depicts a flow diagram of one example of a method by 600 which a hypervisor handles outgoing packets from a virtual machine. In one embodiment, the method is performed by hypervisor 125 of computer system 100, while in some other embodiments, the method may be performed by a hypervisor hosted by some other machine. It should be noted that in some embodiments blocks depicted in FIG. 6 may be performed simultaneously or in a different order than that depicted.

At block 601, hypervisor 125 receives a request from virtual machine 130 to transmit an outgoing packet, and obtains an identification of a receive queue of VM 130. In some examples, the identification of the receive queue may be transmitted along with the request to transmit the outgoing packet, while in some other examples, the identification of the receive queue may be stored in a predefined location of memory 170 by VM 130, while in yet other examples, the identification of the receive queue may be provided to hypervisor 125 in some other fashion. In one embodiment, block 601 is performed by packet manager 128.

At block 602, hypervisor 125 obtains from the header of the outgoing packet a flow identifier that identifies a flow with which the outgoing packet is associated. In one embodiment, block 602 is performed by packet manager 128.

At block 603, hypervisor 125 stores an entry in a table associating the flow identifier with the receive queue identified at block 601. In one example, when there is no entry in the table for the flow identifier, a new entry is created, and when there is already an entry in the table for the flow identifier, the entry is updated accordingly.

In some examples, each table entry may also include a time that indicates when the association is first initiated. In some such examples, the association may be updated only when the difference between the current time and the initiation time exceeds a threshold (e.g., when the timestamp indicates that the flow has been associated with the receive queue for at least S seconds, etc.), so that flows are not shuffled frequently between different receive queues of the virtual machine.

In some examples, each table entry may also include a time that indicates the time at which the most recent incoming packet associated with the flow was received. In some such examples, the table may be maintained such that when the current time exceeds this time for a given entry by more than a threshold, the entry is discarded, the rationale being that the association with the current receive queue has become too old and should be updated.

In some examples, the size of the table may also be limited to a maximum number of entries (i.e., a maximum number of concurrent flows being tracked); in some such examples, the entry that is the most "stale" (i.e., the entry whose "most recent incoming packet" time is the oldest) may be discarded to make room for a new flow/queue association. In one embodiment, block 603 is performed by packet manager 128.

At block 604, the outgoing packet is transmitted to its destination (e.g., via network 150 to another machine, etc.). After block 604, execution continues back at block 601.

Figure 7:
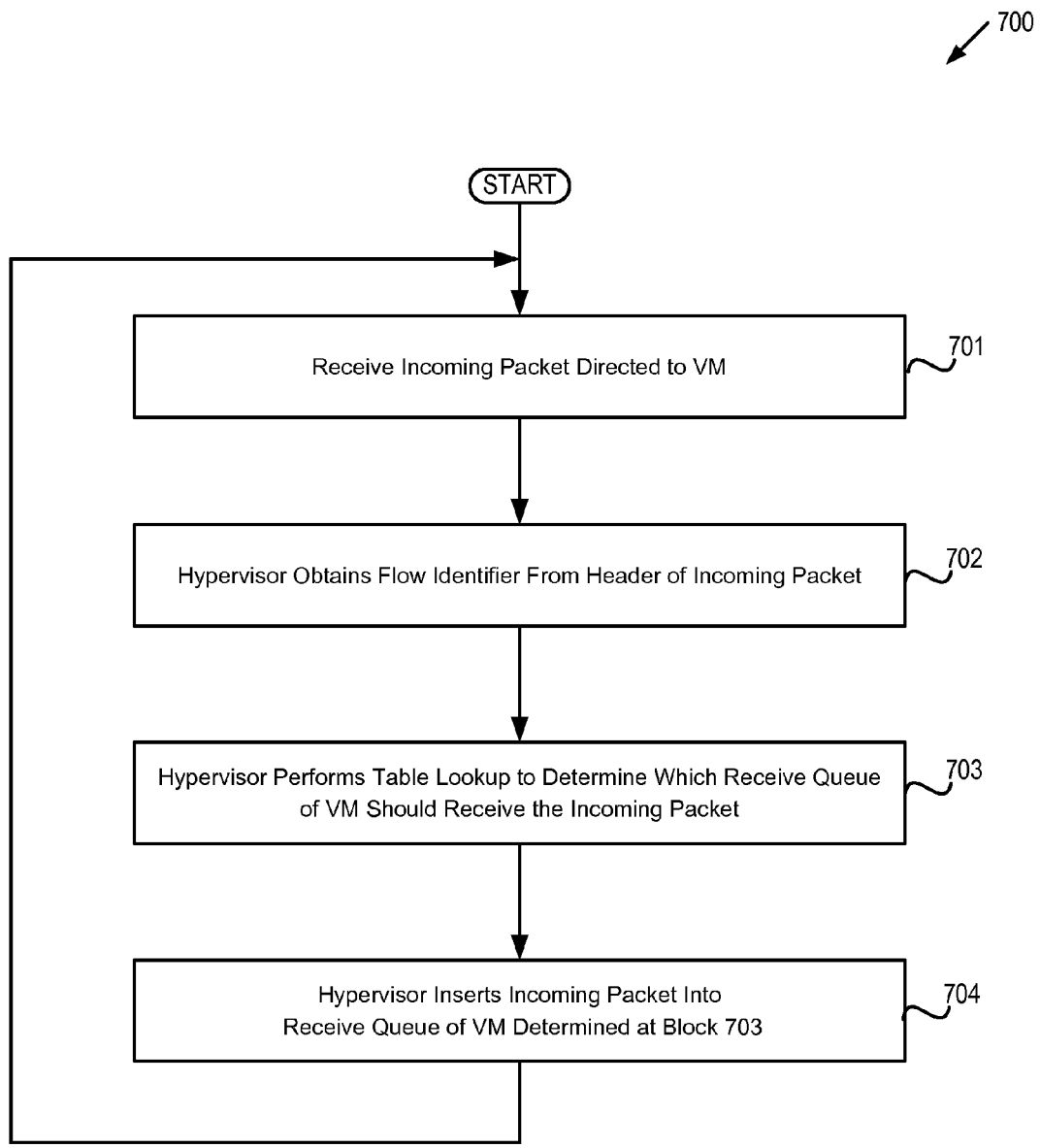
FIG. 7 depicts a flow diagram of one example of a method by which a hypervisor handles incoming packets to a virtual machine.

FIG. 7 depicts a flow diagram of one example of a method by 700 which a hypervisor handles incoming packets to a virtual machine. In one embodiment, the method is performed by hypervisor 125 of computer system 100, while in some other embodiments, the method may be performed by a hypervisor hosted by some other machine. It should be noted that in some embodiments blocks depicted in FIG. 7 may be performed simultaneously or in a different order than that depicted.

At block 701, hypervisor 125 receives an incoming packet directed to VM 130. At block 702, hypervisor 125 obtains from the header of the incoming packet a flow identifier that identifies a flow with which the incoming packet is associated. In one embodiment, blocks 701 and 702 are performed by packet manager 128.

At block 703, hypervisor 125 performs a table lookup of the flow/queue association table to determine which receive queue of VM 130 is associated with the flow identifier and should receive the incoming packet. At block 704, hypervisor 125 inserts the incoming packet into the receive queue determined at block 703. After block 704, execution continues back at block 701. In one embodiment, block 704 is performed by packet manager 128.

Figure 8:
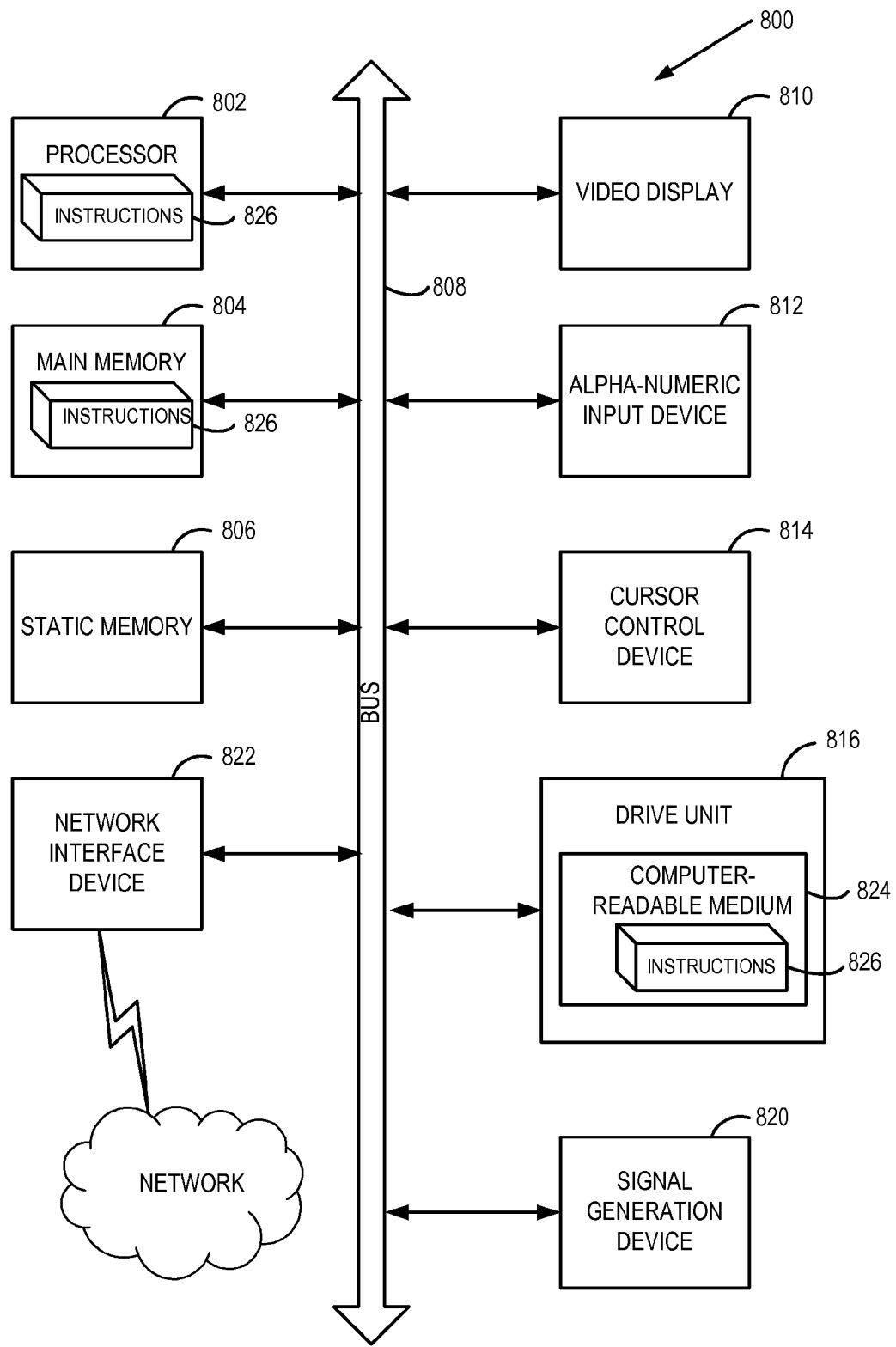
FIG. 8 depicts a block diagram of an illustrative computer system operating in accordance with embodiments of the disclosure.

FIG. 8 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 800 includes a processing system (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 806.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-readable medium 824 on which is stored one or more sets of instructions 826 (e.g., instructions corresponding to the methods of FIGS. 3 through 7, etc.) embodying any one or more of the methodologies or functions described herein. Instructions 826 may also reside, completely or at least partially, within the main memory 804 and/or within the processor 802 during execution thereof by the computer system 800, the main memory 804 and the processor 802 also constituting computer-readable media. Instructions 826 may further be transmitted or received over a network via the network interface device 822.

While the computer-readable storage medium 824 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "obtaining", "storing", "inserting", "transmitting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving from a virtual machine, by a processor executing a hypervisor that is hosted by a computer system, a request to transmit an outgoing packet to a destination, and an identification of a receive queue of a plurality of receive queues of the virtual machine, wherein the identification of the receive queue is provided to the hypervisor by the virtual machine along with the request;
obtaining by the hypervisor, from a header of the outgoing packet, a flow identifier that identifies a flow associated with the outgoing packet;
storing an association between the flow identifier and the receive queue;
transmitting the outgoing packet to the destination;
receiving, after the transmitting of the outgoing packet, an incoming packet whose header specifies the flow identifier; and
inserting, by the hypervisor, the incoming packet into the receive queue using the identification of the receive queue.

2. The method of claim 1 wherein the virtual machine comprises a guest operating system that is modified to provide to the hypervisor the identification of the receive queue along with the request.

3. The method of claim 1 further comprising:
receiving from the virtual machine, by the hypervisor, a subsequent request to transmit a subsequent outgoing packet to the destination, and an identification of a new receive queue, wherein the subsequent outgoing packet is associated with the flow; and
when a time difference between the receiving of the subsequent request and the receiving of the request exceeds a threshold, updating the association to associate the flow identifier with the new receive queue.

4. The method of claim 1 further comprising inspecting the header of the incoming packet to determine that the header specifies the flow identifier.

5. The method of claim 1 wherein the flow specifies at least one of: an Ethernet address of the destination, an Internet Protocol address of the destination, or an Internet Protocol port number of the destination.

6. The method of claim 1 wherein the identification of the receive queue is a queue number or an address of the receive queue.

7. The method of claim 1 wherein the virtual machine has a plurality of transmit queues, and wherein the receive queue is identified by a queue number of a transmit queue.

8. An apparatus comprising:
a memory to store a virtual machine that has a plurality of receive queues; and
a processor, operatively coupled to the memory, to:
execute a hypervisor;
receive from the virtual machine, via the hypervisor, a request to transmit an outgoing packet to a destination, and an identification of a receive queue of the plurality of receive queues of the virtual machine, wherein the identification of the receive queue is provided to the hypervisor by the virtual machine along with the request, and obtain from a header of the outgoing packet, via the hypervisor, a flow identifier that identifies a flow associated with the outgoing packet;
store a record that associates the flow identifier and the receive queue;
transmit the outgoing packet to the destination;
receive, after the transmitting of the outgoing packet, an incoming packet whose header specifies the flow identifier; and
inserting, via the hypervisor, the incoming packet into the receive queue using the identification of the receive queue.

9. The apparatus of claim 8 wherein the virtual machine comprises a guest operating system that is modified to provide to the hypervisor the identification of the receive queue along with the request.

10. The apparatus of claim 8 wherein the processor is further configured to:
store, in a table, an entry that associates the flow identifier, the receive queue, and a time at which the incoming packet is received;
receive, after the incoming packet, a subsequent incoming packet whose header specifies the flow identifier; and
when a time difference between the receiving of the subsequent incoming packet and the receiving of the incoming packet exceeds a threshold, deleting the entry.

11. The apparatus of claim 8 wherein the processor is further configured to:
delete an entry from a table that associates flow identifiers with receive queues when the number of entries in the table exceeds a threshold; and
store in the table an entry that associates the flow identifier and the receive queue.

12. The apparatus of claim 8 wherein the processor is further configured to:
receive from the virtual machine, via the hypervisor, a subsequent request to transmit a subsequent outgoing packet to the destination, and an identification of a new receive queue, wherein the subsequent outgoing packet is associated with the flow; and
when a time difference between the receiving of the subsequent request and the receiving of the request exceeds a threshold, update an entry to associate the flow identifier with the new receive queue.

13. The apparatus of claim 8 wherein the processor is further configured to inspect the header of the incoming packet to determine that the header specifies the flow identifier.

14. The apparatus of claim 8 wherein the flow specifies at least one of: an Ethernet address of the destination, an Internet Protocol address of the destination, or an Internet Protocol port number of the destination.

15. A non-transitory computer readable storage medium, having instructions stored therein, which when executed by a processor, cause the processor to:
   receive from a virtual machine, by a processor executing a hypervisor that is hosted by the computer system, a first request to transmit a first outgoing packet to a first destination, and an identification of a first receive queue of the virtual machine, wherein the identification of the first receive queue is provided to the hypervisor by the virtual machine along with the first request;
   obtain by the hypervisor, from a header of the first outgoing packet, a first flow identifier that identifies a first flow associated with the first outgoing packet;
   store an association between the first flow identifier and the first receive queue;
   transmit the first outgoing packet to the first destination;
   receive from the virtual machine, by the hypervisor, a second request to transmit a second outgoing packet to a second destination, and an identification of a second receive queue of the virtual machine, wherein the identification of the second receive queue is provided to the hypervisor by the virtual machine along with the second request;
   obtain by the hypervisor, from a header of the second outgoing packet, a second flow identifier that identifies a second flow associated with the second outgoing packet;
   store an association between the second flow identifier and the second receive queue;
   transmit the second outgoing packet to the second destination;
   receive, after the transmission of the first outgoing packet and the second outgoing packet, an incoming packet;
   obtain a flow identifier from a header of the incoming packet;
   determine which receive queue of the virtual machine is associated with the flow identifier; and
   insert, by the hypervisor, the incoming packet into the receive queue associated with the flow identifier.

16. The non-transitory computer readable storage medium of claim 15 wherein the virtual machine comprises a guest operating system that is modified to provide to the hypervisor the identification of the first receive queue along with the first request.

17. The non-transitory computer readable storage medium of claim 15 wherein the first flow specifies at least one of: an Ethernet address of the first destination, an Internet Protocol address of the first destination, or an Internet Protocol port number of the first destination.

18. The non-transitory computer readable storage medium of claim 15 wherein the identification of the first receive queue is a queue number or an address of the receive queue.

19. The non-transitory computer readable storage medium of claim 18 wherein the virtual machine has a plurality of transmit queues, and wherein the identification of the first receive queue is a queue number of one of the transmit queues.

* * * * *